(12) United States Patent
Chou

(10) Patent No.: US 7,730,481 B2
(45) Date of Patent: Jun. 1, 2010

(54) METHOD, APPARATUS AND SYSTEM OF ANTI-VIRUS SOFTWARE IMPLEMENTATION

(75) Inventor: Tsun-Sheng Chou, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1446 days.

(21) Appl. No.: 10/841,968

(22) Filed: May 7, 2004

(65) Prior Publication Data

US 2005/0125526 A1    Jun. 9, 2005

(30) Foreign Application Priority Data

Dec. 9, 2003    (CN) .................. 2003 1 0120197

(51) Int. Cl.
 *G06F 9/445* (2006.01)
 *G06F 9/44* (2006.01)
 *G06F 12/14* (2006.01)
 *G06F 11/30* (2006.01)

(52) U.S. Cl. .................. 717/176; 717/121; 717/171; 726/24; 713/188

(58) Field of Classification Search .................. None
See application file for complete search history.

(56) References Cited

U.S. PATENT DOCUMENTS

| 6,393,487 | B2 | 5/2002 | Boucher et al. | |
|---|---|---|---|---|
| 6,587,874 | B1 | 7/2003 | Golla et al. | |
| 6,735,700 | B1* | 5/2004 | Flint et al. | 726/24 |
| 6,779,004 | B1 | 8/2004 | Zintel | |
| 6,892,230 | B1 | 5/2005 | Gu et al. | |
| 2003/0055962 | A1* | 3/2003 | Freund et al. | 709/225 |
| 2004/0107360 | A1* | 6/2004 | Herrmann et al. | 713/201 |
| 2005/0097199 | A1* | 5/2005 | Woodard et al. | 709/223 |

OTHER PUBLICATIONS

"Securing Mobile Appliances: New Challenges for the System Designer", Raghunathan et al., Mar. 2003, <http://delivery.acm.org/10.1145/1030000/1022723/187010176.pdf>.*
"A survey of key management for secure group communication", Rafaeli et al., Sep. 2003, pp. 309-329, <http://delivery.acm.org/10.1145/940000/937506/p309-rafaeli.pdf>.*
"An authorization model for temporal and derived data: securing information portals", Atluri et al., Feb. 2002, pp. 62-94, <http://delivery.acm.org/10.1145/510000/504912/p62-atluri.pdf>.*
"A cooperative immunization system for an untrusting Internet", Anagnostakis et al., Sep. 2003, pp. 403-408, <http://ieeexplore.ieee.org/stamp/stamp.jsp?tp=&arnumber=1266224>.*

* cited by examiner

*Primary Examiner*—Tuan Q Dam
*Assistant Examiner*—Thuy Dao
(74) *Attorney, Agent, or Firm*—Okamoto & Benedicto LLP

(57) ABSTRACT

In one embodiment, an anti-virus verification unit detects connection messages transmitted by a network server and a network client on a network. The anti-virus verification unit determines a network address of the network client according to the connection messages. Using the network address, the anti-virus verification unit verifies if the network client has an anti-virus software.

23 Claims, 4 Drawing Sheets

METHOD, APPARATUS AND SYSTEM OF ANTI-VIRUS SOFTWARE IMPLEMENTATION

BACKGROUND OF THE INVENTION

1. Field of the Invention

The present invention relates generally to anti-virus technology, and in particular to anti-virus software implementation in a computer network.

2. Description of the Related Art

The widespread popularity of the Internet has resulted in some complications, particularly in the enterprise environment. Enterprise users, for example, typically connect to an external network or a computer by various methods through an Intranet.

Intranet users and their status cannot be strictly controlled. This loosely controlled environment provides an opportunity for computer viruses to infect the Intranet. Computer virus infection reduces productivity and causes great damage. Thus, anti-virus software installation is a standard procedure on the construction of an Intranet. That is, all computers connected to an Intranet must have anti-virus software installed to prevent computer virus infection.

An anti-virus software policy can be implemented by requiring all Intranet users to install anti-virus software. This method, however, is inefficient as many users will not install the anti-virus software in their personal computers, as some may believe the anti-virus software will be detrimental to computer performance or may have driver incompatibility.

Another method of anti-virus software implementation is to require all users to install anti-virus software when logging on to a network domain. This method may be enforceable but efficiency suffers if a verification method is not provided to detect continued use of the anti-virus software.

An enterprise can also utilize a probe application that periodically determines if all the computers already connected to the Intranet have anti-virus software installed. If any connected computer does not have anti-virus software installed, the probe application executes an installation program to install anti-virus software on the detected computers. This method provides a greater degree of enforceability but is unsuitable as large enterprises typically have numerous Intranet users. Use of the probe application is time-consuming and consumes network resources. Moreover, the execution and maintenance of the probe program may present additional problems.

Conventionally, anti-virus software implementation is regarded as an internal enterprise task. As mentioned above, more enterprises regard anti-virus software installation as a standard procedure, thus anti-virus software implementation is a developing trend. Existing techniques, however, cannot adequately accomplish anti-virus software implementation.

SUMMARY OF THE INVENTION

The present invention relates to a novel technique of anti-virus software implementation. In one embodiment, the inventive technique utilizes a popular network protocol (e.g., Dynamic Host Configuration Protocol, DHCP) to acquire connection messages. The network address of a computer is obtained according to connection messages, presence of anti-virus software is then detected, and installation is executed if no anti-virus software is present.

In one embodiment, a computer network comprises an anti-virus verification unit, a network server and a network client. The anti-virus verification unit first detects connection messages on the network. The connection messages are transmitted by the network server and the network client. The anti-virus verification unit then determines the network address of the network client according to the connection messages. Finally, the anti-virus verification unit verifies according to the network address if the network client has anti-virus software installed. If not, then the verification unit executes installation of anti-virus software.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
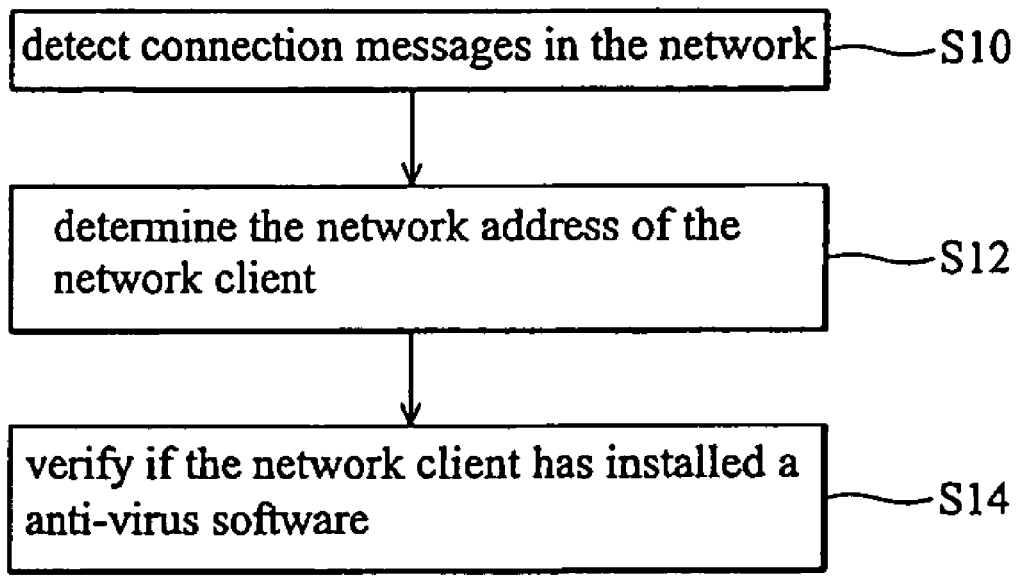
FIG. 1 is a flowchart of a method of anti-virus software implementation according to an embodiment of the present invention.

The present invention relates to techniques of anti-virus software implementation in a network. The network may include an anti-virus verification unit, a network server, and a network client. In one embodiment, the network server is a DHCP (Dynamic Host Configuration Protocol) server, the network client is a computer, such as a desktop computer, a notebook computer, or a PDA (Personal Digital Assistant), attempting network connection. The anti-virus verification unit can be a computer program or an execution module installed in a computer on the network.

The anti-virus verification unit first detects connection messages on the network. The connection messages are transmitted by the network server and the network client. In accordance with DHCP, the connection messages are transmitted to the network by broadcasting. This allows the anti-virus verification unit to detect connection messages on the network.

In accordance with DHCP, the network client transmits a DHCP Discover to the network server to request network connection. The network server will transmit a DHCP Offer and an attached network address on the network after receiving the DHCP Discover. The network client receives the DHCP Offer and the network address from the network. The network client then transmits a DHCP Request to establish a connection to the network according to the network address. If the network server accepts the DHCP Request from the network client, then the network server transmits a DHCP Acknowledgement to verify the connection.

The anti-virus verification unit detects the DHCP Discover transmitted by the network client on the network. The anti-virus verification unit also detects the DHCP Offer and the attached network address transmitted by the network server in response to the DHCP Discover.

The anti-virus verification unit determines the network address of the network client according to the connection messages transmitted on the network. The anti-virus verification unit may use the network address of the network client to verify if the network client has anti-virus software installed. For example, the anti-virus verification unit may send probe packets to the network address of the network client. The probe packets may comprise TCP/UDP (Transmission Control Protocol/User Datagram Protocol) packets containing data for verifying the presence of a particular anti-virus software in the network client. If that particular anti-virus software is present and running in the network client, the anti-virus software may read the probe packet, recognize the probe packet, and accordingly respond to it. If the network client does not respond to the probe packet, the anti-virus verification unit may send another probe packet tailored for another anti-virus software to the network address of the network client. That is, the anti-virus verification unit may have different probe packets to accommodate the different anti-virus software (e.g., for different anti-virus software vendors, versions, etc.)) that may be running in the network client. The anti-virus verification unit may send different probe packets to the network address of the network client until it gets an appropriate response from the network client or until it tries all of its probe packets.

If the network client does not respond to any of the probe packets available to the anti-virus verification unit, the anti-virus verification unit may assume that the network client does not have the requisite anti-virus software. The anti-virus verification unit may then initiate installation of anti-virus software in the network client. For example, a remote login procedure may be employed to login to the network client, copy the necessary files including the anti-virus software and associated setup module to the network client, and create and start a remote service in the network client to launch the setup module and thereby install the anti-virus software in the network client. Other means for remotely installing a piece of software may also be used without detracting from the merits of the present invention.

The anti-virus verification unit may be implemented in a computer on the network. For example, the anti-virus verification unit may be implemented as a computer program or an execution module installed in a computer on the network. Neither implementation places excessive extra load on the network. Moreover, it is not necessary to install the anti-virus verification unit in each computer on the network as with the probe application. Thus, execution efficiency is enhanced, particularly for multi-national enterprises or other heavily trafficked networks.

The invention additionally includes a storage medium for storing a computer program providing a method of anti-virus software implementation for a network. In one embodiment, the storage medium comprises program codes for performing the previously described steps.

Furthermore, the invention includes an apparatus of anti-virus software implementation in a network. The network may include a network server and a network client. The inventive apparatus may include a connection message detection module, a network address determination module, and an anti-virus software verification module. In one embodiment, the network adopts DHCP, the network server is a DHCP server, and the network client is a computer attempting network connection. The inventive apparatus can be installed in a computer on the network, for example.

The connection message detection module detects connection messages transmitted by the network server and the network client on the network. In one embodiment, the connection message detection module includes a DHCP Discover detection module and a DHCP Offer detection module. The DHCP Discover detection module detects a DHCP Discover transmitted on the network. The DHCP Discover may be transmitted by the network client to the network server to request network connection. The DHCP Offer detection module detects a DHCP Offer. The DHCP Offer attached to a network address may be transmitted by the network server in response to the DHCP Discover.

The network address determination module may determine the network address of the network client from the connection messages, i.e. the DHCP Discover and the DHCP Offer. The anti-virus software verification module verifies if the network client has installed anti-virus software according to the network address. This may be performed by, for example, transmitting probe packets to the network address of the network client as described above. If anti-virus software is not installed on the client, the verification module may initiate anti-virus software installation in the network client.

Moreover, the invention includes an anti-virus software implementation system. In one embodiment, the inventive system comprises a network and an anti-virus verification unit.

In one embodiment, the network adopts DHCP as the network protocol, and includes a network server and a network client. The network server and the network client transmit connection messages on the network. In one embodiment, the network server is a DHCP server and the network client is a computer attempting network connection. The anti-virus verification unit can be installed in a computer on the network.

The anti-virus verification unit determines the network address of the network client based on the connection messages and, using the network address, verifies if the network client has installed anti-virus software. If anti-virus software is not installed in the network client, the anti-virus verification unit may initiate installation of anti-virus software in the network client.

In accordance with DHCP, the network client transmits DHCP Discover to the network server to request network connection. The network server then sends a DHCP Offer and an attached network address to the network. The network client acquires the DHCP Offer and the network address from the network and transmits a DHCP Request to attempt connection using the acquired network address. If the network server accepts the DHCP Request from the network client, the network server transmits a DHCP Acknowledgement to verify the connection. The anti-virus verification unit in accordance with an embodiment of the invention may only need a DHCP Discover and a DHCP Offer to operate. DHCP Discover and DHCP Offer are transmitted on the network by broadcasting, thus allowing the anti-virus verification unit to verify the presence of anti-virus software on every computer attempting to connect to the network.

FIG. 1 is a flowchart of a method of anti-virus software implementation according to an embodiment of the present invention. A method of anti-virus software implementation may be performed in a network including a network server and a network client. In one embodiment, the network server is a DHCP server, the network client is a computer desiring to connect to the network. An anti-virus verification unit may be a computer program or an execution module installed in a computer on the network, for example.

The anti-virus verification unit first detects connection messages on the network (step S10). The connection messages are transmitted by the network server and the network client. In accordance with DHCP, the connection messages are transmitted to the network by broadcasting, thus allowing the anti-virus verification unit to detect the connection messages.

Next, the anti-virus verification unit determines a network address of the network client from the connection messages (step S12). Finally, the anti-virus verification unit verifies if the network client has installed anti-virus software according to the network address (step S14). Step S14 may be performed by transmitting probe packets to the network client using the detected network address, for example. If anti-virus software is not installed on the network client, then the verification unit may initiate installation of anti-virus software in the network client.

Figure 2:
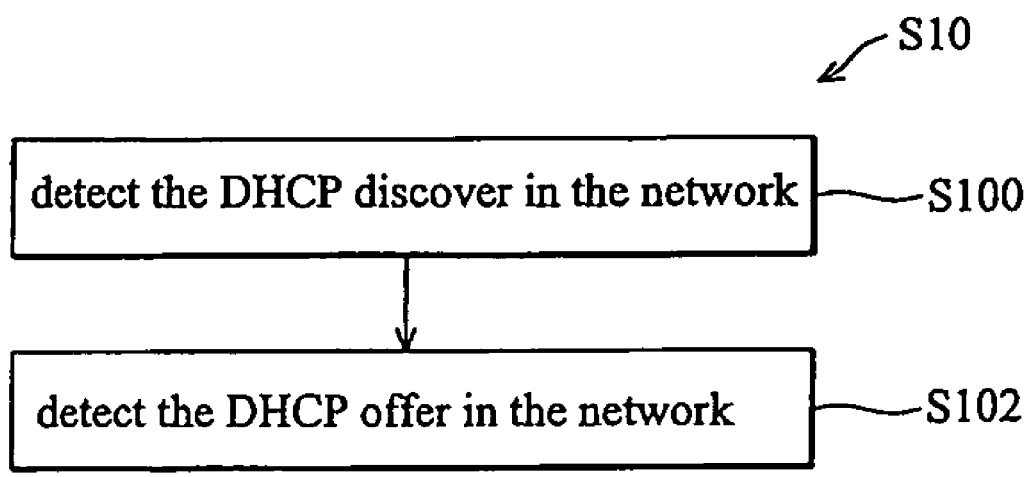
FIG. 2 is a flowchart detailing the step of detecting connection messages in the network in the method of FIG. 1, according to an embodiment of the present invention.

FIG. 2 is a flowchart detailing step S10 of FIG. 1, in accordance with an embodiment of the present invention. The anti-virus verification unit first detects a DHCP Discover on the network (step S100). The DHCP Discover is transmitted by the network client to the server to request network connection. The anti-virus verification unit further detects a DHCP Offer and an attached network address transmitted by the network server in response to the DHCP Discover (step S102).

Figure 3:
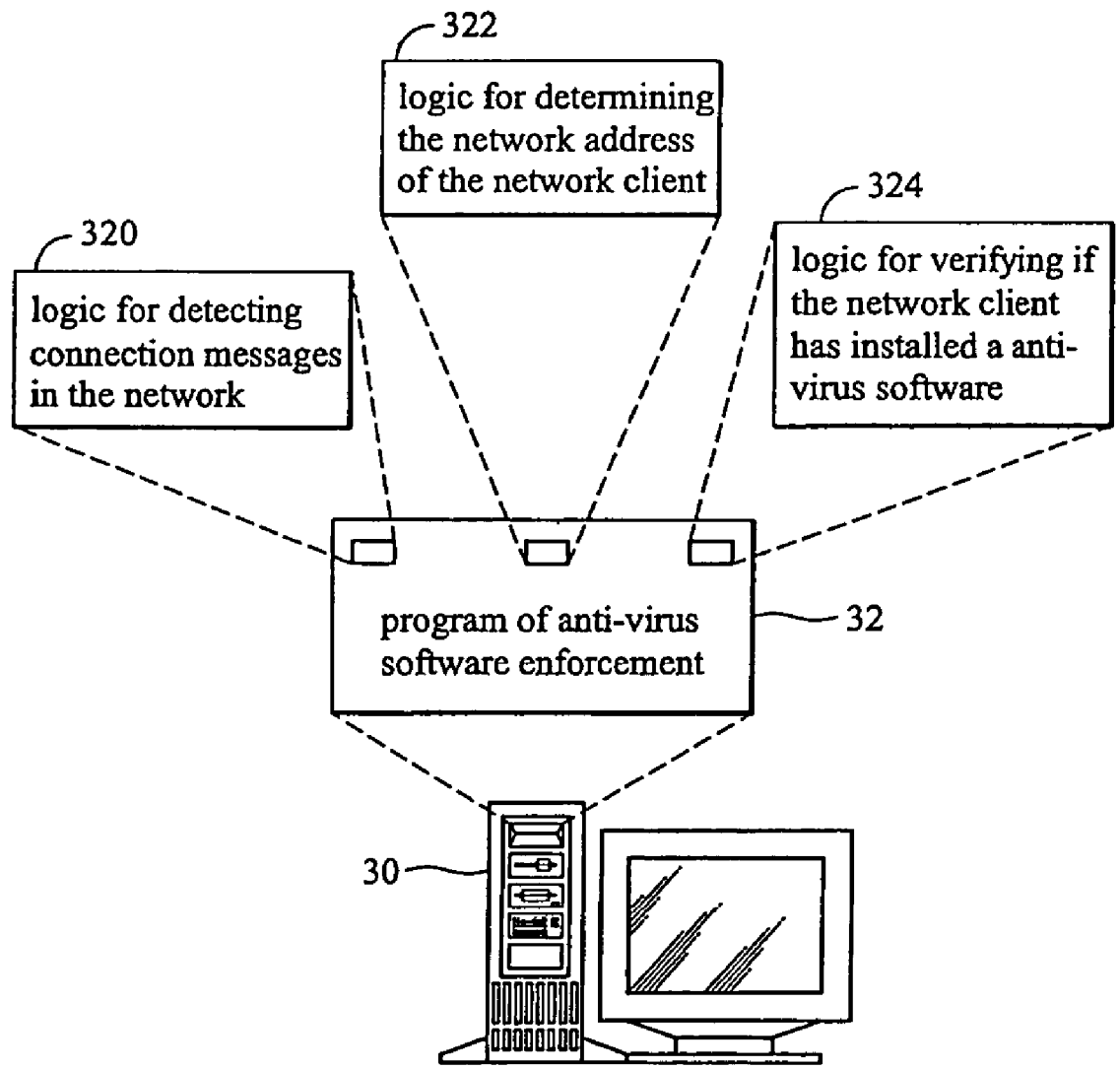
FIG. 3 is a schematic diagram of a storage medium for storing a computer program providing a method of anti-virus software implementation according to an embodiment of the present invention.

FIG. 3 is a schematic diagram of a storage medium for storing a computer program providing a method of anti-virus software implementation according to an embodiment of the present invention. The storage medium 30 stores a computer program 32. The computer program 32 provides a method of anti-virus software implementation for a network. The computer program 32 may include logic or program code for detecting connection messages on the network 320, logic or program code for determining the network address of the network client 322, and logic or program code for verifying the installation of anti-virus software 324.

Figure 4:
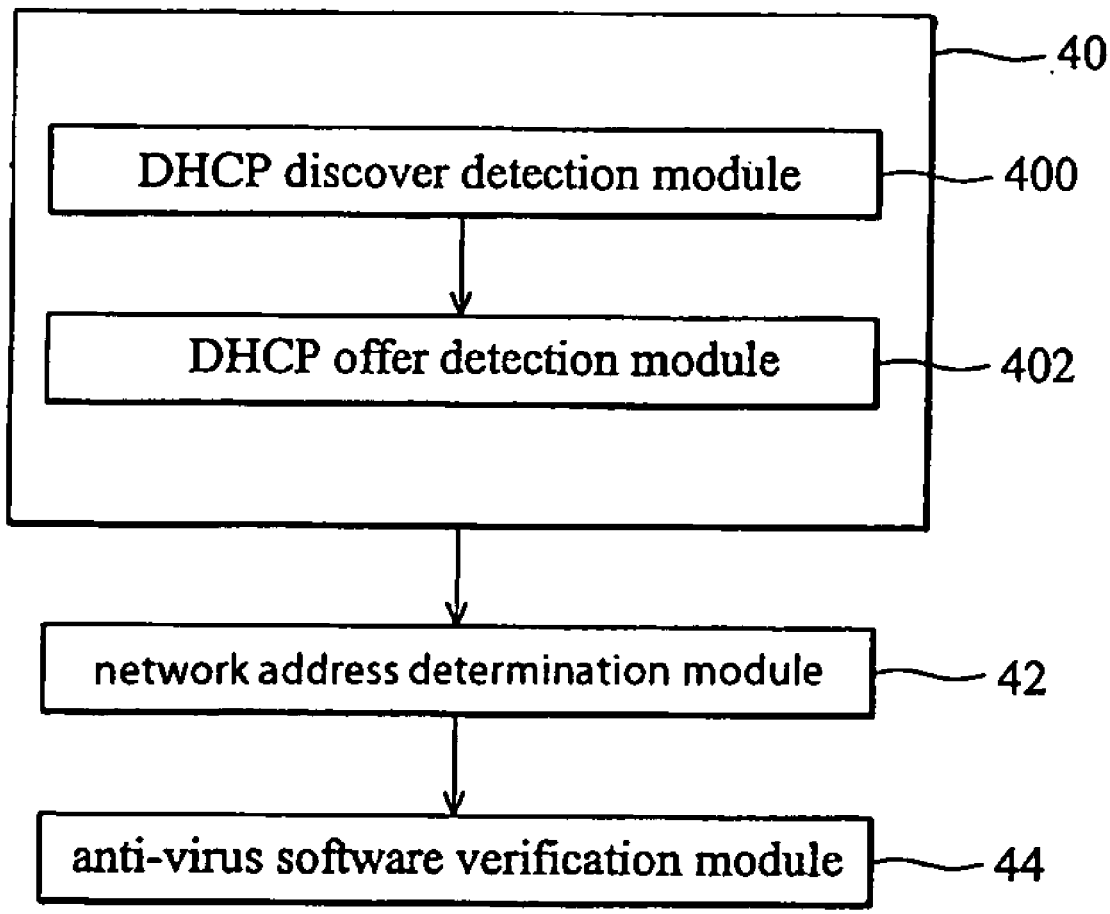
FIG. 4 is a schematic diagram of an apparatus of anti-virus software implementation according to an embodiment of the present invention.

FIG. 4 is a schematic diagram of an apparatus of anti-virus software implementation according to an embodiment of the present invention. In one embodiment, the invention provides an anti-virus software implementation apparatus for a network with a server and a client. The inventive apparatus may include a connection message detection module 40, a network address determination module 42, and an anti-virus software verification module 44.

The connection message detection module 40 detects connection messages transmitted by the network server or the network client on the network. The connection message detection module 40 includes a DHCP Discover detection module 400 and a DHCP Offer detection module 402. The DHCP Discover detection module 400 detects DHCP Discover. The DHCP Discover is transmitted by the network client to the network server to request network connection. The DHCP Offer detection module 402 detects a DHCP Offer. The DHCP Offer attached to the network address is transmitted by the network server to respond to the DHCP Discover.

The network address determination module 42 determines the network address of the network client according to the connection messages. The anti-virus software verification module 44 verifies if the network client has installed anti-virus software according to the network address. For example, the anti-virus software verification module 44 may send a probe packet to the network address and wait for a response. If the appropriate anti-virus software is running at the network address, the anti-virus software may receive the probe packet and respond accordingly. Otherwise, the anti-virus software verification module 4.4 will not get a response, indicating that the anti-virus software is not present at the network address. If anti-virus software is not installed on the network client at the network address, the anti-virus software verification module 44 executes installation of the anti-virus software on the client.

Figure 5:
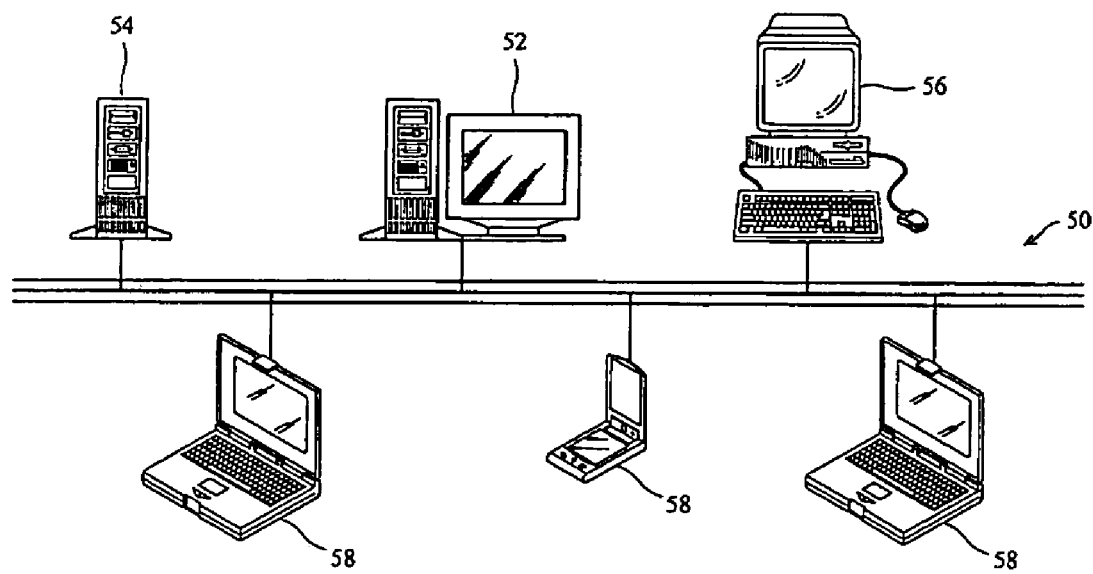
FIG. 5 is a schematic diagram of an anti-virus software implementation system according to an embodiment of the present invention.

FIG. 5 is a schematic diagram of an anti-virus software implementation system according to an embodiment of the present invention. In one embodiment, the anti-virus software implementation system may comprise a network 50 and an anti-virus verification unit 52.

In one embodiment, the network 50 adopts DHCP as the network protocol, and includes a network server 54 and a network client 56. The network server 54 and network client 56 transmit connection messages on the network 50. In one embodiment, the network server 54 is a DHCP server and the network client 56 is a computer attempting network connection. The anti-virus verification unit 52 may be part of a computer on the network 50.

The anti-virus verification unit 52 detects the connection messages transmitted by the network server 54 and the network client 56, determines a network address of the network client 56 according to the connection messages, and, using the network address of the network client 56, verifies if the network client 56 has installed anti-virus software. If the network client 56 has not installed anti-virus software, the anti-virus verification unit 52 may initiate installation of anti-virus software on the network client 56.

Further, in FIG. 5, the network 50 adopts DHCP as the network protocol. In another embodiment, the network 50 has a network server 54, an anti-virus verification unit 52, a network client 56, and other computers 58 connecting to the network 50. In that embodiment, the anti-virus detection unit 52 is an independent computer on the network 50.

When the network client 56 connects to the network 50, the network client 56 transmits a DHCP Discover to the network 50 to request connection. The network server 54 transmits a DHCP Offer with a network address to the network 50 after receiving the DHCP Discover. The network client 56 acquires the DHCP Offer with the attached network address from the network 50. The network client 56 then transmits a DHCP Request for request connection to the network 50 using the acquired network address. If the network server 54 accepts the connection request, the network server 54 then transmits a DHCP Acknowledgement to verify the connection. Thereafter, the network client 56 can connect to the network 50.

As mentioned above, the DHCP Discover and the DHCP Offer include the network address of the network client. Thus, the anti-virus verification unit 52 can determine the network address of the network client 56 according to the DHCP Discover and the DHCP Offer. The anti-virus verification unit then checks if the network client 56 has installed anti-virus software. If anti-virus software is not installed on network client 56, the anti-virus verification unit then executes installation before allowing connection.

Thus, embodiments of the invention may utilize the connection messages broadcast on the network by a popular network protocol, e.g., DHCP, to implement anti-virus software installation. The embodiments of the invention may be implemented in a computer network at relatively low cost, enhancing execution efficiency, particularly when applied to multi-national enterprises or other heavily trafficked networks.

It will be appreciated from the foregoing description that the method and system described herein provide a dynamic and robust solution to anti-virus software implementation problems for a network. If, for example, the network replaces computers or changes the network protocol, the method and system of the present invention can be revised accordingly.

The methods and systems disclosed herein, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of anti-virus software implementation for a network, the method executed by program code loaded into a computer, the method comprising:
   detecting a connection message broadcasted by a network client on a network to request connection to the network;
   determining a network address of the network client based on the connection messages; and
   using the network address, verifying if the network client has installed anti-virus software by sending to the network client a first set of packets containing data for verifying presence of a particular anti-virus software in the network client, if the particular anti-virus software is present and running in the network client, waiting for the particular anti-virus software itself to receive and recognize the first set of packets to respond to the first set of packets, and if the particular anti-virus software is not present or not running in the network client, sending to the network client a second set of packets containing data for verifying presence of another anti-virus software in the network client.

2. The method as claimed in claim 1, further comprising:
   if the network client does not receive a response from an anti-virus software, initiating installation of an anti-virus software in the network client.

3. The method of claim 1 wherein detecting the connection message broadcasted by the network client comprises:
   detecting a DHCP (Dynamic Host Configuration Protocol) Discover broadcasted by the network client to request network connection; and
   detecting a DHCP Offer broadcasted by a network server in response to the DHCP Discover.

4. The method of claim 3 wherein the network server comprises a DHCP server.

5. The method of claim 1 wherein the method is performed by an anti-virus verification unit that is installed in a computer on the network.

6. The method of claim 1 wherein the network adopts a Dynamic Host Configuration Protocol (DHCP).

7. The method of claim 6 wherein the network client is a computer attempting to connect to the network.

8. A storage medium for storing a computer program providing a method of anti-virus software implementation for a network, the storage medium comprising:
   program code for detecting a connection message broadcasted by a network client on a network to request connection to the network;
   program code for determining a network address of the network client according to the connection message; and
   program code for verifying if the network client has installed anti-virus software according to the network address by sending packets to the network client to determine presence of a particular anti-virus software in the network client and, if the anti-virus software is present and running in the network client, waiting for the particular anti-virus software itself to receive and recognize the packets to respond to the packets.

9. The storage medium of claim 8 further comprising:
   program code for initiating installation of an anti-virus software on the network client if an anti-virus software is not installed thereon.

10. The storage medium of claim 8 wherein the program code for detecting the plurality of connection messages comprises:
    program code for detecting a DHCP Discover broadcasted by the network client to request network connection; and
    program code for detecting a DHCP Offer broadcasted by a network server in response to the DHCP Discover.

11. The storage medium of claim 10 wherein the network server comprises a DHCP server.

12. The storage medium of claim 8 wherein the network adopts a Dynamic Host Configuration Protocol (DHCP).

13. An apparatus for anti-virus software implementation in a network, the apparatus comprising storage memory that in turn comprises:
    a connection message detection module configured to detect a connection message broadcasted by a network client on a network to request connection to the network;
    a network address determination module coupled to the connection message detection module, the network address determination module being configured to determine a network address of the network client according to the connection message broadcasted by the network client; and
    an anti-virus software verification module coupled to the network address determination module, the anti-virus software verification module being configured to use the network address to verify if the network client has installed anti-virus software by sending packets to the network client to determine presence of a particular anti-virus software in the network client and, if the particular anti-virus software is present and running in the network client, waiting for the particular anti-virus software itself to receive and recognize the packets to respond to the packets.

14. The apparatus of claim 13 wherein the anti-virus software verification module initiates installation of anti-virus software in the network client if anti-virus software is not installed thereon.

15. The apparatus of claim 13 wherein the connection message detection module comprises:
    a DHCP Discover detection module configured to detect a DHCP Discover broadcasted by the network client to request network connection; and
    a DHCP Offer detection module coupled to the DHCP Discover detection module, the DHCP Offer detection module being configured to detect a DHCP Offer broadcasted by a network server to respond to the DHCP Discover.

16. The apparatus of claim 15, wherein the network server comprises a DHCP server.

17. The apparatus of claim 13 wherein the network adopts a Dynamic Host Configuration Protocol (DHCP).

18. An anti-virus software implementation system comprising:
   a network having a network server and a network client, wherein the network client broadcasts a connection message to request connection to the network; and
   an anti-virus verification unit coupled to the network, the anti-virus verification unit being configured to detect the connection message, to determine a network address of the network client according to the connection message, and to verify if the network client has installed anti-virus software according to the network address by sending packets to the network client to determine presence of a particular anti-virus software in the network client and, if the particular anti-virus software is present and running in the network client, waiting for the particular anti-virus software itself to receive and recognize the packets to respond to the packets.

19. The system of claim 18 wherein the anti-virus verification unit initiates installation of anti-virus software in the network client if anti-virus software is not installed thereon.

20. The system of claim 18 wherein the connection message by the network client comprises a DHCP Discover broadcasted by the network client.

21. The system of claim 20 wherein a network server comprising a DHCP server responds to the DHCP discover broadcasted by the network client.

22. The system of claim 18 wherein the anti-virus verification unit is installed on a computer on the network.

23. The system of claim 18 wherein the network adopts a Dynamic Host Configuration Protocol (DHCP).

* * * * *